United States Patent Office 3,093,499
Patented June 11, 1963

3,093,499
CEMENT PACK SET INHIBITOR
George W. Blackwood and Dunbar L. Shanklin, Winchester, Mass., assignors to W. R. Grace & Co., Cambridge, Mass., a corporation of Connecticut
No Drawing. Filed Feb. 2, 1961, Ser. No. 86,579
4 Claims. (Cl. 106—90)

This invention relates to improving the transporting and handling of bulk Portland cement.

More particularly, this invention comprises introducing a small amount of a lower tertiary alkyl acetate into a mass of dry cement to prevent pack set when the cement is stored or transported in bulk.

Most cements, when compacted by vibration, e.g., when transported in a hopper car, become semi-rigid and will not flow until considerable mechanical effort has been applied to break up the compaction. This condition is known as pack set, and is to be distinguished from warehouse or bag set caused by incipient hydration. It is known that a cement is less likely to pack set if certain additives are incorporated into the cement during or after grinding.

Cleavage of the particles during grinding of cement clinkers exposes fresh or nascent surfaces. These fresh surfaces have high energies or reactivities probably because of the breaking of ionic bonds. The surface forces of the particles persist for some time after grinding and lead to pack set and/or poor cement fluidity if they are not properly reduced. Undue reduction or the complete absence of these surface forces or attraction between the cement particles is undesirable because the cement becomes excessively fluid or flowable. If, on the other hand, the surface forces are too great, the cement tends to pack set and to have low bulk densities because of the presence of high void volume agglomerates. Low bulk densities mean that less cement by weight can be stored in a hopper or silo.

What one wishes to achieve is an optimum or controlled state of dry dispersion of the ground cement particles in air. Proper control of the dispersion of the particles in the air-continuous phase leads to the desired degree of fluidity both during and after grinding.

It has been known that certain polar molecules when added to the cement either during or after grinding, will attach to the particles and reduce their surface forces. If the amount of additive used and/or if the time of addition are not correct, however, the optimum dry dispersion is not obtained. For example, if an unduly active additive is present during grinding, it will cause a cement to have an extreme fluidity while in the mill. This will result in the cement passing rapidly through the mill before it is reduced to the desired size and thus in an increase in recycle of oversized material. The same additive, however, may give acceptable performance if mixed with the cement after grinding. Conversely, an additive which produces the desired degree of dry dispersion when ground with the clinker may or may not be effective if admixed after grinding. While these general principles are known, the particular response that a cement will display to specific additives is difficult to predict.

It has now been found that tertiary butyl acetate is a surprisingly effective cement pack set inhibitor when interground with the cement. In many cases it also improves grinding efficiencies and increases the compressive strength of the mortar. The inhibitor is used in an amount of 0.01 to 0.04, preferably 0.015 to 0.03 weight percent.

The data in the following table illustrate the effects that tertiary butyl acetate has on dry cement and on the mortar. The data appearing in this table were obtained by testing individual batches of the same Type I cement, each of which was prepared in the following manner: a sample of clinker was charged to a laboratory steel ball grinding mill and the desired amount of additive was introduced through a hollow shaft by means of a graduated pipette. The mill was then closed, heated to a temperature between 210–230° F. and rotation commenced. After a fixed number of revolutions taking about 70 minutes, the mill was stopped and the pack set index and other properties of the cement were determined.

*Table*

RUN A

| Additive | Weight Percent Added | BSA, sq. cm./g. | Air, Percent | Pack Set Index | Pack Set Ratio | Compressive Strength, p.s.i. | | |
|---|---|---|---|---|---|---|---|---|
| | | | | | | 1 day | 7 days | 28 days |
| Blank | | 3,200 | 10.0 | 44 | | 750 | 2,950 | 4,800 |
| TBA | 0.02 | 3,430 | 9.4 | 5 | 9:1 | 925 | 3,612 | 5,900 |
| TBA | 0.04 | 3,390 | 9.7 | 4 | 11:1 | 807 | 3,600 | 5,522 |

RUN B

| Blank | | 3,160 | 9.9 | 64 | | 752 | 2,825 | 4,750 |
| TBA | 0.01 | 3,265 | 10.3 | 15 | 4:1 | 795 | 2,925 | 4,738 |
| TBA | 0.02 | 3,390 | 10.7 | 6 | 11:1 | 818 | 3,162 | 5,075 |
| 100% Acetic Acid | 0.02 | 3,245 | 9.5 | 9 | 7:1 | 828 | 3,218 | 5,062 |

Notes:
BSA = Blaine Surface Area by ASTM C204-55.
Air by ASTM C185-58T.
Compressive Strength by ASTM C109-58 (Using 2 inch cube).
Analysis of clinker (Lehigh Cement Co., Fogelsville, Pennsylvania):
  BSA _____ sq. cm/g __ 1050
  $SiO_2$ _____ weight percent __ 21.0
  $Al_2O_3$ _____ do ____ 6.5
  $Fe_2O_3$ _____ do ____ 2.5
  $SO_3$ _____ do ____ 2.1
  $K_2O$, $Na_2O$ _____ do ____ 0.75
  $MgO$ _____ do ____ 3.5
  $CaO$ _____ do ____ 63.0

"Pack set index" is a relative term which numerically indicates how prone a particular cement is to pack set when it is stored or transported in bulk. Pack set index ratio is the relative pack set index of the untreated sample to the treated sample. This ratio is used to permit comparison between different samples of clinker.

The pack set index is obtained in the following manner: 100 grams of cement are placed in a 250 cubic centimeter Erlenmeyer flask set on top of a variable vibrator. The flask should be placed in the same position on the vibrator for each test. A simple jig can be used to accomplish this. The vibrator is a Syntron "Single-Action" paper jogger, Model PJ-4, having a knob by means of which the vibration is adjusted. The knob is set at 165° and the Erlenmeyer flask containing the cement is vibrated for 15 seconds. After vibration, the flask is removed from the vibrator, fitted into a plywood jig with axis of the flask being horizontal. The flask is then rotated around its axis until the cement, which had compacted on the bottom of the flask, collapses. The Erlenmeyer flask is twisted with 180° turns at approximately 100 twists per minute. The number of 180° twists required for the cement sample to collapse establishes the pack set index. The same flask should be used for any series of tests.

The pack set index obtained by this method correlates well with the field performance of the cement. The higher the pack set index of a particular cement, the more prone a large volume of that cement is to pack set if stored or transported in bulk.

With reference to the table, the surface area increase obtained over the blank indicates that grinding efficiencies are improved. The additive has little effect on air entrainment with this type of cement, which is desirable. It noticeably increases the compressive strength of the motar to a surprising extent.

The pack set indices indicate that the tertiary butyl acetate reduced the tendency of this cement to pack set in the field some 80–90 percent. Tests with other Type I and Type II cements have shown that this inhibition effect is generally applicable.

Table I also establishes that tertiary butyl acetate is superior to acetic acid. Acetic acid is known to be a very effective pack set inhibitor. Besides its obnoxious odor and corrosiveness, a pack set inhibiting amount of acetic acid is not usually added to a grinding mill because it excessively reduces mill retention time and impairs grinding rather than helping it. It is believed that while acetic acid can be effectively added in small amounts after grinding, its use during grinding gives adverse results because it vaporizes at the grinding temperatures and becomes too available to the nascent surfaces, resulting in excessive reduction of the surface forces and undue fluidity.

Tertiary butyl acetate has also been compared to a commercially used grinding aid and pack set inhibitor—86 percent calcium lignin sulphonate—14 percent triethanolamine—and was found to be about equivalent as a grinding aid, and superior as a pack set inhibitor.

The tertiary butyl acetate is readily added as 100 percent liquid. It is immiscible with water. If desired, however, it can be diluted with other materials compatible with it, such as alcohols, that do not detract from the quality of the cement or mortar.

Having described this invention, what is sought to be protected by Letters Patent is succinctly set forth in the following claims.

What is claimed is:

1. A composition consisting essentially of Portland cement and 0.01 and 0.04 weight percent of tertiary butyl acetate intimately admixed therewith, said tertiary butyl acetate reducing the tendency of said cement to pack set during storage and transportation in bulk.

2. The composition of claim 1 containing in the range of 0.015 to 0.03 weight percent tertiary butyl acetate.

3. The process of reducing the tendency of Portland cement to pack set during storage and transportation which comprises: intimately admixing 0.01 to 0.04 weight percent of tertiary butyl acetate with said cement during the grinding thereof.

4. The process of claim 3 wherein 0.015 to 0.03 weight percent of tertiary butyl acetate is admixed with the cement during the grinding thereof.

References Cited in the file of this patent

UNITED STATES PATENTS

| | | |
|---|---|---|
| 1,957,415 | Wechter | May 1, 1934 |
| 1,998,667 | Fritz et al. | Apr. 23, 1935 |
| 2,203,809 | Bechtold | June 11, 1940 |
| 2,857,286 | Striker | Oct. 21, 1958 |